United States Patent Office
3,537,713
Patented Nov. 3, 1970

3,537,713
WEAR-RESISTANT LABYRINTH SEAL
Jennifer V. Matthews, Phoenix, and Charles W. Mulkin, Scottsdale, Ariz., assignors to The Garrett Corporation, Los Angeles, Calif., a corporation of California
Filed Feb. 21, 1968, Ser. No. 707,267
Int. Cl. F02f 11/00; F16j 15/48
U.S. Cl. 277—55                                8 Claims

ABSTRACT OF THE DISCLOSURE

This labyrinth seal has first and second relatively movable members with a rub-tolerant layer on one and spaced continuous projections on the other. The projections have relatively thin edges which are coated with a wear-resistant material and are initially disposed in closely spaced relation to the surface of the rub-tolerant layer, and when relative movement between the members takes place some engagement of the edges with the rub-tolerant layer may take place. The layer is of a composition such that when the edges of the projections engage it during relative movement the material will be displaced to one or both sides to form grooves. The resulting interfitting projection edges and grooves form a tortuous passage and reduce the flow of fluids between the members.

SUMMARY

This invention relates generally to seals of the type employed to prevent or control the flow of fluids, such as gases or liquids, between regions of different pressures. More particularly, the invention relates to seals for use between relatively movable machine components, such as shafts and surrounding structure. Still more particularly, the invention relates to seals of the labyrinth type used in relatively high-temperature environments such as are encountered in gas turbine engines. Seals of this character heretofore proposed have been unsuccessful for a number of reasons, one of which is that the material of the seal parts expanded and contracted under the influence of temperature change and friction to such an extent during use that parts initially sized for proper operation seized, wore rapidly, were distorted, fractured, or otherwise failed to function and required premature removal and replacement. Also, the designs of some prior seals provided such excessive clearance that inefficiency of operation resulted.

It is an object of this invention to provide a labyrinth seal which will avoid the objections to prior devices by restricting leakage between relatively movable parts to a practical minimum, by having a prolonged life, and by requiring no interim attention or service.

Another object of the invention is to provide a labyrinth seal which is composed of materials selected to improve the leakage-resistant characteristics of the device during use and to lengthen the period of useful life.

Still another object of the invention is to provide a labyrinth seal having relatively movable parts, one of which has a layer of material tolerant to rubbing, i.e., it will not become rough, abrade, or wear away appreciably, but when subjected to penetrating force will be displaced to either side of the point of force application to form a groove, the displaced material accumulating at the sides of the groove to increase its effective depth.

Still another object of the invention is to provide a labyrinth seal having relatively movable parts, one of which has a layer of material which is relatively soft and porous and the other has a series of continuous ribs for limited engagement with such layer so that when during use the ribs engage the layer, the material of the layer at the location of engagement will cold-flow to the sides of the ribs and form recesses, the displaced material piling up at the sides and increasing the depth of the recesses.

A further object of the invention is to form the layer of displaceable material mentioned in the preceding object from a sintered metallic fiber, so that it will have the requisite porosity to be displaceable and to coat the edges of the ribs with a relatively harder wear-resistant material to preserve the ribs and extend their service life. The sintered metallic fiber may be made by the method set forth in the article appearing on pp. 126–128 of the Aug. 10, 1959, issue of the publication Steel, or by the method set forth in Pat. No. 3,127,668 to Troy. A material found suitable in actual experience for the displaceable material layer is a commercially available metallic fiber made by the latter method and sold by Huyck Metals Company of Milford, Conn., under the trademark "Feltmetal." A coating found suitable for the ribs is a product sold under the trademark Metco 404.

Other objects and advantages will become apparent to those skilled in the art upon a perusal of the following description of one embodiment of the invention selected for illustration in detail in the accompanying drawings.

THE DRAWINGS

DESCRIPTION

Figure 1:
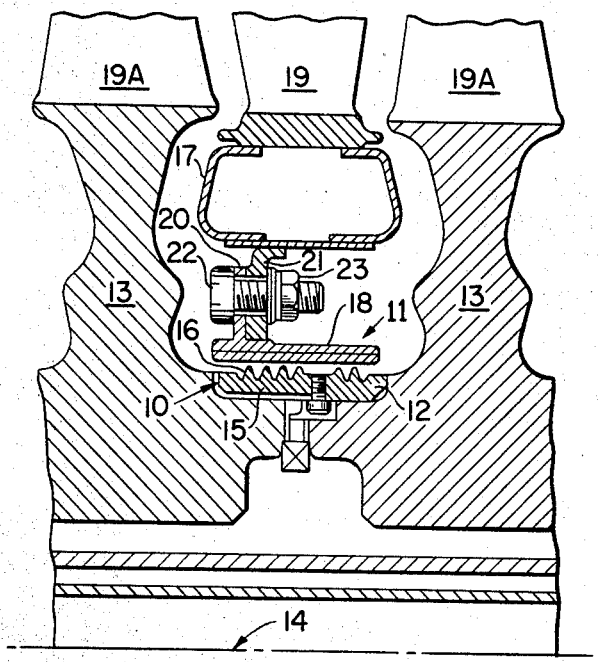
FIG. 1 is a fragmentary detail axial sectional view taken through a seal embodying the invention incorporated in a gas turbine engine between adjoining turbine stages.

The principles of the seal embodying the present invention are suitable for use between any two relatively movable elements wherein it is desirable to preclude or limit fluid flow between the regions on opposite sides of the seal. As illustrated in FIG. 1 of the drawings, the seal is particularly useful in controlling fluid leakage between adjacent stages of a gas turbine engine. In such figure, the seal is generally designated by the numeral 10. It includes a stationary part 11 and a rotating part 12. The latter is mounted between adjacent disks 13 of the turbine wheel assembly supported for rotation about an axis 14. In the present illustration, the disks 13 are separately formed but are secured to rotate together by curvic coupling (interengaging lugs) formed on the wheel hubs. The rotating part 12 of the seal comprises a sleeve element 15 which is pressed onto the hub of one of the wheels and projects over the curvic coupling.

Sleeve 15 is provided on the outer side with a plurality of spaced projections 16 which extend completely and continuously around the sleeve. These projections, ribs or rings, as they may be designated, are tapered or reduced in thickness at their outer edges to provide narrow lands, the widths depending upon the diameters of the seal as well as other parameters, such as, (a) radial clearance between movable and stationary seal parts, (b) spacing of sealing edges, (c) difference in pressures in regions separated by seal, and (d) number of sealing edges. In one typical application, the lands were approximately .010 inch wide on a rotatable sleeve substantially 1.5 inches in diameter. This relation may or may not be critical, depending upon the particular installation. It is important to note that the projections are spaced axially of the sleeve; this spacing is somewhat critical and the reason therefor will be set forth hereinafter. By pressing the sleeve onto the hub of one of the wheels, it will be caused to rotate in unison with the wheel assembly. It may be found desirable in some instances to insure the unitary rotation of the sleeve and wheel by pinning the sleeve to the hub.

One way this objective can be achieved is by inserting one or more headed pins into the sleeve from the inner side and forming recesses in the hub to receive the heads of the pins when the sleeve is pressed onto the hub.

FIG. 1 shows that the seal part 11 is mounted on a separator 17, which in turn is fixed to a part of the turbine casing or frame (not shown). The separator 17 extends from the casing into the space between adjacent wheel disks to confine fluid flow from one turbine stage to the next to a path constituting the regular gas passage containing inlet nozzle vanes 19 and wheel blades 19A. The seal of the present invention further confines gas flow to such path by controlling leakage around the wheel hubs between the turbine stages.

Figure 2:
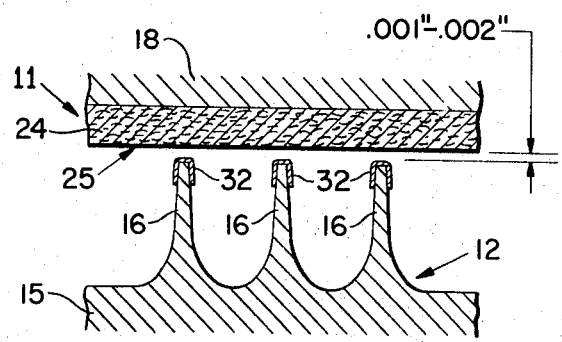
FIG. 2 is a similar section of the seal only on an enlarged scale in the condition at assembly.
Figure 3:
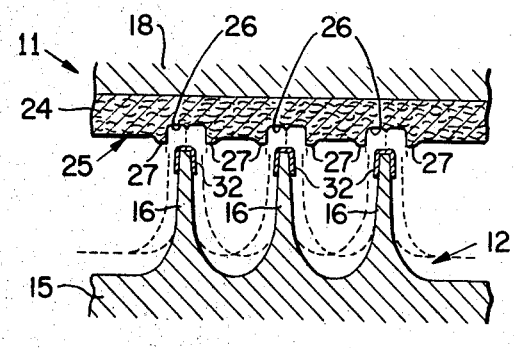
FIG. 3 is also a similar view on an enlarged scale showing the seal after the engine has been operated.

Seal part 11 has a supporting tube 18 with an external flange 20 secured to an internal flange 21 on the separator 17 by bolts and nuts, 22, 23. The tube 18 is substantially as long as the sleeve element 15 and is disposed about the same axis, i.e., the axis of rotation of the turbine rotor assembly. As illustrated in FIGS. 2 and 3, particularly, the sleeve 18 has an inner layer 24 formed therein. This layer is composed of a rub-tolerant material, i.e., a material which will not gall, tear, abrade, or ball up when engaged with a relatively movable element. The material, preferably, is displaceable when forcibly engaged with a penetrating force so that at least part of such material will cold-flow to the sides of the engaging instrumentality and form a depression, the sides of which are slightly higher because of the addition of the material from the depression. This feature is particularly shown in FIG. 3. It may be augmented slightly due to relative axial movement between the turbine wheel assembly and casing during operation of the turbine, as indicated by dotted lines in this figure. One material found suitable for the inner layer 24 is the commercially available product sold by Huyck Metals Company of Milford, Conn., under the trademark "Feltmetal" which, according to information published by the manufacturer, is composed of metal fibers which have been felted, pressed and sintered. While any metal compatible with the temperatures and gases encountered during turbine operation may be employed, we have found that "Feltmetal" made with fibers of an alloy known commercially as "H.S. 25," gives satisfactory performance. While it would be highly desirable to have the rotating assembly of the engine so constructed, balanced, and mounted that it would turn precisely, with no runout and not relative axial movement, it is obviously humanly impossible to secure such a result. The seal parts are, therefore, formed of selected material and designed so that upon initial installation in the turbine, the edges of the projections will be spaced from the inner surface 25 of the layer 24 a very slight distance, for example, from .001 to .002 inch. (See FIG. 2.)

When the turbine is operated, the parts will be heated and some expansion will take place which may reduce the initial clearance between the rotatable and stationary seal parts. The rotating assembly may also pass through critical vibration stages in which some interference or engagement between the seal parts occurs. At such times, the relatively narrow coated edges of the projections 16 may forcibly engage the surface 25 and displace some of the material of the layer. Since the material of the layer is softer than that of the projections, the deformation will occur on the stationary seal part and grooves 26 will be formed. As explained above, the displaced material flows to the sides of the projections and increases the height of the groove side walls. In the event relative axial movement between the rotor and casing occurs, more material at the groove sides will be displaced and piled up, as at 27 on the inner surface 25 of the layer 24. By spacing the projections 16 sufficiently in excess of the potential axial movement of the turbine rotating assembly, the ridges 27 between the grooves will be maintained. The build-up of such ridges resulting from the displaced material will increase the tortuousness of the path between the seal parts and improve the effectivity of the device.

As mentioned above and set forth in the objects, the rub-tolerant layer 24 may be formed of a variety of materials. It may be suitably applied to the internal surface of the support tube 18, the preferred method being one from which the requisite porosity of the material will result. Any method of fabricating the layer 24 may be employed so long as the material may be displaced by the projecting ribs 16 during engine operation to form the alternate ridges 27 and grooves 26.

It will be obvious that the figures in the drawing are magnified to make the construction more readily discernable and that the edges of the ribs or rings 16 are actually relatively thin. This invention resides in providing the edges thereof with a thin coating 32 of a harder protective material, such as molybdenum or a nickel aluminide compound sold under the trademark Metco 404. This coating may be applied in any suitable manner, such as flame-spraying. Such coating will be limited to the portions of the ribs or rings adjacent the thin outer edges, as shown in FIG. 2.

It will be understood that modifications and variations may be effected without departing from the spirit and scope of the novel concepts of this invention.

We claim:

1. A labyrinth seal between two elements disposed for relative movement in normally spaced, substantially parallel lines, said elements being capable, under abnormal conditions of operation, of limited engagement with one another, comprising:
 (a) a layer of seal-forming material on one of said elements, said layer being of substantially uniform thickness exceeding the potential abnormal limited engaging movement of said elements, the material of said layer being composed of a sintered metal fiber product formed in a manner to provide a predetermined porosity and give the material the characteristic of being displaceable to either side of a point of application of a penetrating force;
 (b) a plurality of continuous relatively narrow ribs provided on the other of said elements, said ribs being spaced normal to the direction of relative movement between said elements and extending toward the seal-forming material on the first element; and
 (c) a coating of relatively hard wear-resistant material on the outer edges of said ribs, said elements being disposed initially to position the coating on the ribs in closely spaced relation to the surface of the seal-forming layer.

2. The labyrinth seal of claim 1 in which the initial spacing of the coating on the ribs from the surface of the seal-forming layer is within .0021 inch.

3. The labyrinth seal of claim 1 in which the layer of seal-forming material is in the form of a sleeve on a stationary element and the ribs are provided on a rotating element within the sleeve.

4. The labyrinth seal of claim 3 in which the outer edges of the ribs are coated with nickel aluminide.

5. The labyrinth seal of claim 3 in which the material of the seal-forming layer is sintered metallic fibers of an alloy identified commercially as H.S. 25, and the outer edges of the ribs are coated with nickel aluminide.

6. The labyrinth seal of claim 3 in which the material of the seal-forming layer is sintered metallic fibers of an alloy equivalent to that identified commercially as H.S. 25, and the outer edges of the ribs are coated with molybdenum.

7. The labyrinth seal of claim 5 in which the coating on said ribs is of a .002- to .004-inch thickness.

8. The labyrinth seal of claim 4 in which the layer of seal-forming material is composed of sintered metallic fiber identified commercially as Feltmetal and the outer edges of the ribs are coated with a nickel aluminide compound identified commercially as Metco 404.

(References on following page)

References Cited

UNITED STATES PATENTS

| | | | |
|---|---|---|---|
| 2,904,449 | 9/1959 | Bradstreet | 117—105.2 X |
| 3,092,306 | 6/1963 | Eder | 277—53 X |
| 3,129,069 | 4/1964 | Hanink et al. | |
| 3,340,084 | 9/1967 | Eisenlohr | 117—105.2 X |
| 3,339,933 | 9/1967 | Foster | 277—53 |

FOREIGN PATENTS 924,016  4/1969  Great Britain.

SAMUEL ROTHBERG, Primary Examiner

U.S. Cl. X.R.

253—77; 117—105.2; 230—133